(12) United States Patent
Shah et al.

(10) Patent No.: US 8,832,578 B1
(45) Date of Patent: Sep. 9, 2014

(54) VISUAL CLIPBOARD ON SOFT KEYBOARD

(75) Inventors: Roma Shah, San Francisco, CA (US);
Nicholas Jitkoff, Palo Alto, CA (US);
Alex Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 78 days.

(21) Appl. No.: 13/314,823

(22) Filed: Dec. 8, 2011

(51) Int. Cl.
*G06F 9/54* (2006.01)

(52) U.S. Cl.
CPC .................................. *G06F 9/543* (2013.01)
USPC ............ 715/770; 715/222; 715/224; 715/226

(58) Field of Classification Search
CPC ................................ G06F 9/543; G06F 9/544
USPC .................. 715/234, 724, 222, 224, 226, 770
See application file for complete search history.

(56) References Cited

U.S. PATENT DOCUMENTS

| | | | | |
|---|---|---|---|---|
| 8,234,561 | B1 * | 7/2012 | Bourdev ........................ | 715/224 |
| 2005/0149854 | A1 * | 7/2005 | Pennell et al. ................. | 715/507 |
| 2006/0059247 | A1 * | 3/2006 | Marappan et al. ............. | 709/219 |
| 2006/0179404 | A1 * | 8/2006 | Yolleck et al. ................ | 715/507 |
| 2007/0038756 | A1 * | 2/2007 | Waldorf et al. ............... | 709/227 |
| 2007/0112832 | A1 * | 5/2007 | Wong et al. ................... | 707/102 |
| 2007/0168434 | A1 * | 7/2007 | Accapadi et al. ............. | 709/206 |
| 2008/0109832 | A1 * | 5/2008 | Ozzie et al. ................... | 719/329 |
| 2008/0158161 | A1 * | 7/2008 | Engel ............................. | 345/168 |
| 2008/0201656 | A1 * | 8/2008 | Kim et al. ..................... | 715/770 |
| 2008/0282180 | A1 * | 11/2008 | Glasgow et al. ............. | 715/770 |
| 2009/0327960 | A1 * | 12/2009 | Dernis .......................... | 715/823 |
| 2011/0125970 | A1 * | 5/2011 | Commarford et al. ........ | 711/126 |
| 2011/0126092 | A1 * | 5/2011 | Harris ........................... | 715/256 |
| 2012/0246594 | A1 * | 9/2012 | Han et al. ..................... | 715/790 |

OTHER PUBLICATIONS

Spartan Multi Clipboard, by M8 Software, published Nov. 27, 2006, pp. 1-5.*

* cited by examiner

*Primary Examiner* — Manglesh M Patel
*Assistant Examiner* — Ahamed I Nazar
(74) *Attorney, Agent, or Firm* — Troutman Sanders LLP; James E. Schutz; Christopher W. Glass

(57) ABSTRACT

Disclosed herein are methods, systems, and non-transitory computer readable media for displaying a clipboard. A method can include receiving at a client device, two or more copied pieces of content copied from one or more resources, receiving an indication to display the two or more copied pieces of content, determining a form field associated with the indication, ranking the two or more copied pieces of content based on the form field, and displaying at the client device, a clipboard with the two or more copied pieces of content ranked.

16 Claims, 4 Drawing Sheets

VISUAL CLIPBOARD ON SOFT KEYBOARD

FIELD

The embodiments relate generally to copying and pasting functionality.

BACKGROUND

Various applications on computing devices allow users to copy content such as text and images, and paste the content that was just cut or copied. For example, most word processing applications allow for copying of text and content by a user. A user selects the text to copy in an application with either shortcut keys or using menu options, and can later paste the same content in a different area within the application. However, a user is limited often in the pasting functionality associated with each application.

BRIEF SUMMARY

One innovative aspect of the subject matter described by this specification may be embodied in methods that include the actions of receiving two or more copied pieces of content copied from one or more resources, receiving at a client device, an indication to display the two or more copied pieces of content, determining a field type associated with the indication, ranking the two or more copied pieces of content based on the field type, and displaying on the client device a clipboard with the two or more copied pieces of content ranked.

Another aspect of the subject matter described by this specification may be embodied in a system that includes one or more computers and one or more storage devices storing instructions that are operable, when executed by the one or more computers, to cause the one or more computers to perform operations comprising: receiving at a client device two or more copied pieces of content copied from one or more resources, receiving an indication to display the two or more copied pieces of content, determining a field type associated with the indication, ranking the two or more copied pieces of content based on the field type, and displaying on the client device, a clipboard with the two or more copied pieces of content ranked.

Another aspect of the subject matter described by this specification may be embodied in a non-transitory computer-readable medium storing software comprising instructions executable by one or more computers which, upon such execution, cause the one or more computers to perform operations comprising: receiving two or more copied pieces of content copied from one or more resources, receiving an indication to display the two or more copied pieces of content, determining a field type associated with the indication, ranking the two or more copied pieces of content based on the field type, and displaying on the client device, a clipboard with the two or more copied pieces of content ranked.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

A touch screen of a computing device may allow a user to scroll or interact with a document or application on the touch screen device using the user's finger(s). A user can copy content displayed on the touch screen using shortcut keys or menu options on a specific application currently displayed. The copied content can all be stored and displayed for the user upon receipt of a special command or by pressing a key on the touch screen keyboard.

Figure 1:
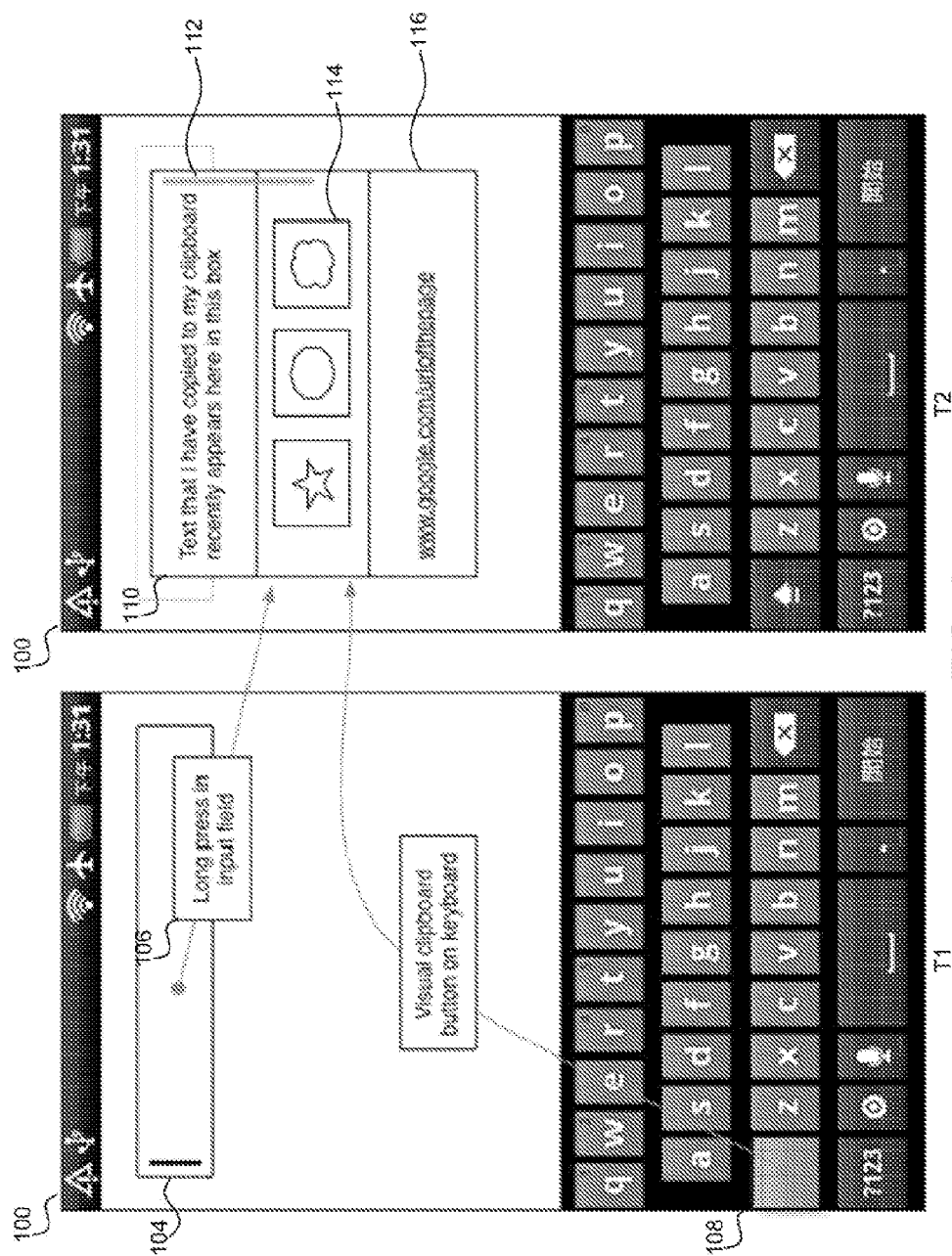
FIG. 1 is an example screenshot content being copied and pasted.

FIG. 1 shows an illustration of a user using a touch screen of computing device 100.

The user may be using one or more applications at T1 on the computing device 100 and may select and copy various types of content, such as text and images while using the applications. When the user comes to a point 104 when he wants to paste one of the pieces of copied content, the user can select a key displayed on the keyboard 108 which will bring up a visual clipboard 110 at T2 displaying all the copied content.

In another implementation, the user can bring up the same visual clipboard 110 by pressing in a field where he wants to paste an item with a long press 106.

The visual clipboard 110 displays a list of all previous copied content. The text can include for example, copies of copied sentences, or email addresses. The images can include images copied from a web site or from a document.

When the visual clipboard 110 is displayed, the contents can first be ranked by the visual clipboard so that depending on a form field of where the user is going to paste an item, the contents associated with that form field are displayed first. For example, if the form field requires an email address, the copied pieces of content that are email addresses are displayed at the top of the list. The visual clipboard 110 can include text 112, images 114, URLs 116, and so on.

Figure 2:
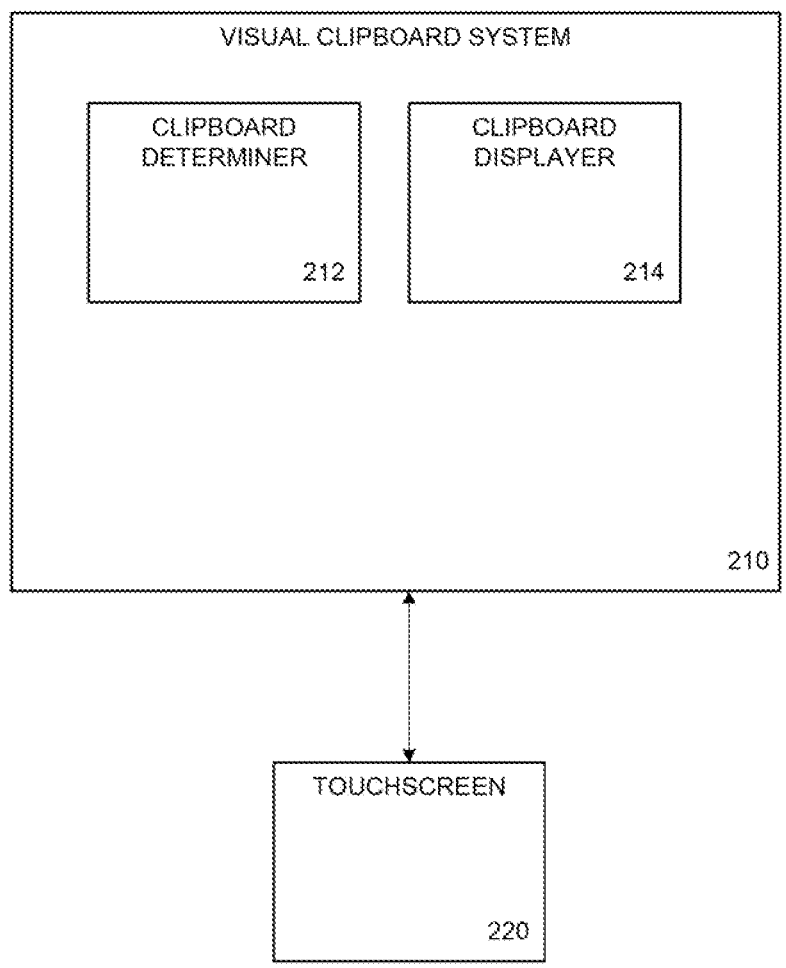
FIG. 2 is a block diagram of an example system that provides a visual clipboard.

FIG. 2 illustrates an example system 200 for implementing and displaying a visual clipboard. System 200 includes visual clipboard system 210, which includes clipboard determiner 212, and clipboard displayer 214. Clipboard system 210 can also include touch screen display 220. System 200 may be implemented on or implemented with a computing device. For example, visual clipboard system 210 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop or any other user carried device), game console, set-top box, remote control, kiosk, embedded system or other device having at least one processor and memory. A computing device may include a communication port or I/O device for communicating over wired or wireless communication link(s).

Computing devices such as a monitor, all-in-one computer, smartphone, tablet computer, remote control, etc., may include a touch screen display 220 that accepts user input via touching operations performed by a user's fingers or other instrument.

A user may be viewing a document, multimedia or portion of text, or on a web site and select one or more pieces of content to copy. The user can copy content whether its text, video or images, one after another. As the content is copied, clipboard determiner 212 stores each piece of copied content.

The content can be copied using a variety of different methods. For example, the content can be copied using short cut keys such as "ctrl c," or using menu options which allow for a "copy" function to be performed. In other implementations, a special key on a touch screen keyboard or manual keyboard can be used to copy the content.

The user can at any point perform a paste function on computing device 100. In one implementation, the user can perform a paste function by pressing a special key on a soft keyboard on the touch screen of computing device 100. For example, the touch screen keyboard may include a special paste key as shown in FIG. 1A, 108.

In another implementation, the user can perform the paste function by using shortcut keys such as a "ctrl v," or using menu options to perform the "paste" function. In another implementation, the user can perform a long gesture event, such as a long press event in a field where he wants to paste a copied piece of content.

Upon receiving an indication that the user wants to paste a copied piece of content, clipboard determiner 212 identifies a form field associated with the indication. The form field describes the field on the web site or document the user has indicated into which he wants to paste an item. For example, the form field can include an email address field on a web site, or an image field.

Clipboard determiner 212 identifies the form field and ranks the copied pieces of content based on the form field. Therefore, the items that are associated with the same form field are ranked higher than other items.

For example, suppose the form field is an email address. Clipboard determiner 212 currently has a list of ten pieces of content, three of which are emails, four text pieces, and three images. Upon determining that the indication to paste is received from a field that requires an email address, clipboard determiner 212 arranges the copied pieces of content so that the email address are listed at the top.

Clipboard displayer 214 then displays the clipboard to the user. Therefore, when the visual clipboard is presented to the user, the user can see all the email addresses listed at the top for easy access.

Figure 3:
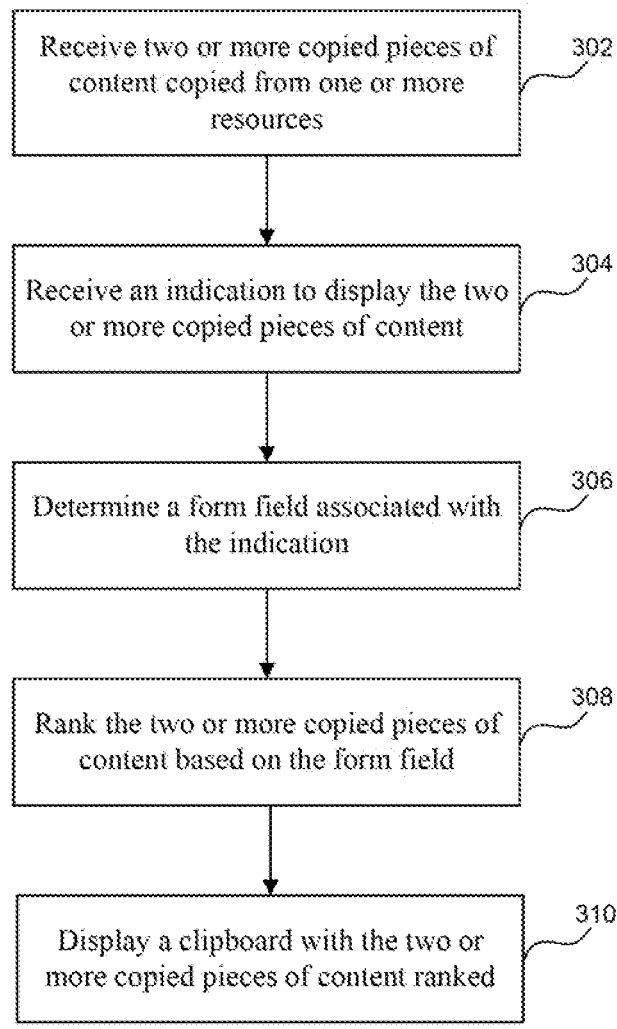
FIG. 3 is a flowchart of an example process for providing a visual clipboard.

FIG. 3 is a flowchart illustrating an example method 300 for displaying a visual clipboard.

At step 302, two or more copied pieces of content copied are received from one or more resources. In one implementation, the copied content can be received from the same resource, such as a web site or a word processing document. In another implementation, the copied content can be received from different resources, for example, content from the website and copied content from a word processing document.

For example, as shown in the figures, clipboard determiner 212 may receive the copied pieces of content from various resources. The content can include text, images, video, audio files, etc.

At step 304, an indication is received to display the two or more copied pieces of content. For example, clipboard determiner 212 may receive an indication to display copied content from an application on computing device 100.

The indication can be received from the same resource that the user copied content from, or from a different resource. For example, a user can copy content from a web site and then decide to paste content into a word processing document.

The indication can be one of a paste command such as "ctrl v." In other implementation, the indication can received from a keyboard on the client device to display the two or more copied pieces of content and therefore includes an indication of a special key pressed on the keyboard. For example, when the keyboard is a soft keyboard, system 210 can determine the keys to display on the soft keyboard. Therefore, the system can display a soft key that is associated with pasting items.

At step 306, a file type associated with the indication is determined. For example, clipboard determiner 212 can determine the file type associated with the indication.

In one implementation, clipboard determiner 212 can receive a form field associated with indication. In one implementation, if the form field is an email address form field, then when the indication is sent to clipboard determiner 212, the form field is also sent. Clipboard determiner 212 can then determine the file type based on the form field. Clipboard determiner 212 analyzes the form field and determine what file types are associated with that form field.

At step 308, the two or more copied pieces of content are ranked based on the form field. For example, clipboard determiner 212 can rank the copies pieces of content so that the content associated with the form field are ranked higher than the content not associated with the form field. In one implementation, a type of the form field can also be determined. The type of the form field is a specific form field. The type of the form field identifies whether the form field is specifically for an email address, an image or text.

At step 310, a clipboard is displayed with the two or more copied pieces of content ranked. For example, clipboard displayer 214 displays the clipboard.

Figure 4:
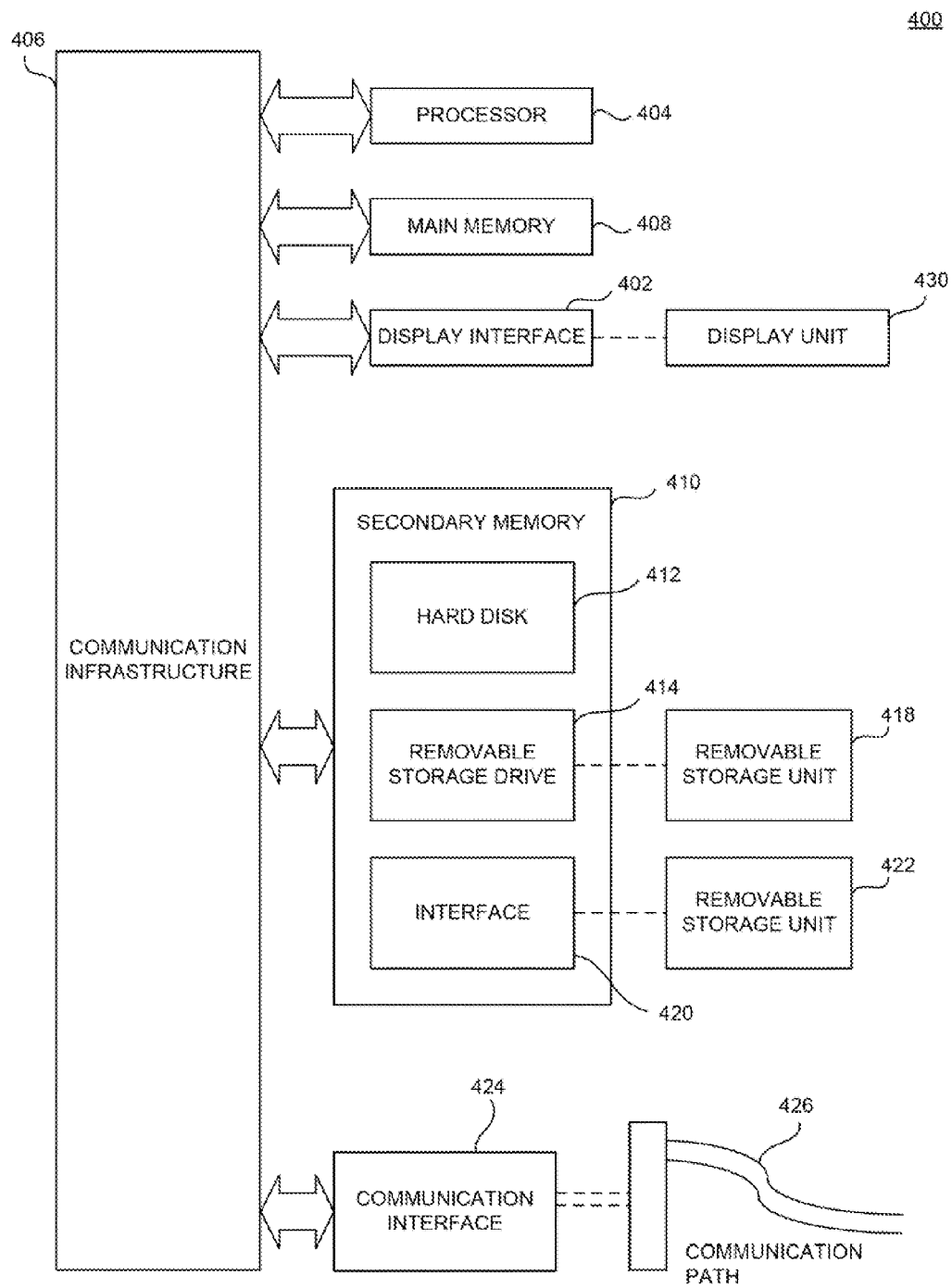
FIG. 4 is a block diagram of example computer architecture.

Various aspects of the present invention can be implemented by software, firmware, hardware, or a combination thereof. FIG. 4 illustrates an example computer system 400 in which the embodiments, or portions thereof, can be implemented as computer-readable code. For example, system 200 carrying out method 300 of FIG. 3 can be implemented in system 400. Various embodiments of the invention are described in terms of this example computer system 400.

Computer system 400 includes one or more processors, such as processor 404. Processor can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive and/or a removable storage drive. Removable storage drive 414 may include a floppy disk drive, a magnetic tape drive, an optical disk drive, a flash memory, or the like. The removable storage drive 414 reads from and/or writes to removable storage unit 418 in a well-known manner. Removable storage unit 418 may include a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the term "computer readable storage medium" is used to generally refer to media such as removable storage unit 418, removable storage unit 422, and a hard disk installed in hard disk drive 412. Computer readable storage medium can also refer to one or more memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the embodiments as discussed herein. In particular, the computer programs, when executed, enable processor 404 to implement the processes of embodiments of the present invention, such as the steps in the methods discussed above. Accordingly, such computer programs represent controllers of the computer system 400. Where embodiments are implemented using software, the software may be stored in a computer program product and loaded into computer system 400 using removable storage drive 414, interface 420, or hard drive 412.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The Summary and Abstract sections may set forth one or more but not all exemplary embodiments of the present invention as contemplated by the inventor(s), and thus, are not intended to limit the present invention and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   receiving, at a processor of a computing device, indications of two or more copied pieces of content copied from one or more resources;
   receiving, at the processor, an indication of a selection of a form field, wherein the form field is not one of the one or more resources;
   determining a form field type of the selected form field;
   ranking the two or more copied pieces of content based on the form field type of the selected form field, wherein pieces of content of the two or more copied pieces of content associated with the form field type of the selected form field are ranked higher than pieces of content of the two or more copied pieces of content that are not associated with the form field type of the selected form field; and
   outputting, by the processor, for display, a ranked clipboard including:
      a first visual indicator corresponding to a first copied piece of content, of the two or more copied pieces of content, that is associated with the form field type of the selected form field; and a second visual indicator corresponding to a second piece of content, of the two or more copied pieces of content, that is not associated with the form field type of the selected form field, wherein the first visual indicator and second visual indicator, as output for display, are arranged in the ranked clipboard in an order according to respective rank.

2. The method of claim 1, wherein the indication of the selection of the form field includes a paste command.

3. The method of claim 1, wherein determining the form field type includes:
receiving content of the form field; and
determining the form field type based on the content of the form field.

4. The method of claim 1, wherein the form field type is at least one of an email address field, an image field, and a text box field.

5. The method of claim 1, wherein the one or more resources include at least one of a web page and an application.

6. A system, comprising:
one or more processors; and
a memory coupled to the one or more processors and storing instructions that, when executed by the one or more processors, cause the system to:
receive indications of two or more copied pieces of content copied from one or more resources;
receive an indication of a selection of a form field, wherein the form field is not one of the one or more resources;
determine a form field type of the selected form field;
rank the two or more copied pieces of content based on the form field type to of the selected form field, wherein pieces of content of the two or more copied pieces of content associated with the form field type of the selected form field are ranked higher than pieces of content of the two or more copied pieces of content that are not associated with the form field type of the selected form field; and
output, for display, a ranked clipboard including:
a first visual indicator corresponding to a first copied piece of content, of the two or more copied pieces of content, that is associated with the form field type of the selected form field; and
a second visual indicator corresponding to a second piece of content, of the two or more copied pieces of content, that is not associated with the form field type of the selected form field,
wherein the first visual indicator and second visual indicator, as output for display, are arranged in the ranked clipboard in an order according to respective rank.

7. The system of claim 6, wherein the indication of the selection of the form field includes a paste command.

8. The system of claim 6, wherein the operations to determine the form field type further include operations to:
receive content of the form field; and
determine the form field type based on the content of the form field.

9. The system of claim 6, wherein the form field type is at least one of an email address field, an image field, and a text box field.

10. The system of claim 6, wherein the one or more resources include at least one of a web page and an application.

11. The method of claim 1, wherein the two or more pieces of content are copied from at least two of the one or more resources.

12. A non-transitory computer-readable medium storing instructions that, when executed by one or more processors, cause a computing device to:
receive indications of two or more copied pieces of content copied from one or more resources;
receive an indication of a selection of a form field, wherein the form field is not one of the one or more resources;
determine a form field type of the selected form field;
rank the two or more copied pieces of content based on the form field type of the selected form field, wherein pieces of content of the two or more copied pieces of content associated with the form field type of the selected form field are ranked higher than pieces of content of the two or more copied pieces of content that are not associated with the form field type of the selected form field; and
output for display, a ranked clipboard including:
a first visual indicator corresponding to a first copied piece of content, of the two or more copied pieces of content, that is associated with the form field type of the selected form field; and
a second visual indicator corresponding to a second piece of content, of the two or more copied pieces of content, that is not associated with the form field type of the selected form field,
wherein the first visual indicator and second visual indicator, as output for display, are arranged in the ranked clipboard in an order according to respective rank.

13. The non-transitory computer-readable medium of claim 12, wherein the indication of the selection of the form field includes a paste command.

14. The non-transitory computer-readable medium of claim 12, wherein the restrictions further include to:
receive content of the form field; and
determine the form field type based on the form field.

15. The non-transitory computer-readable medium of claim 12, wherein the form field type is at least one of an email address field, an image field, and a text box field.

16. The non-transitory computer-readable medium of claim 12, wherein the one or more resources include at least one of a webpage and an application.

* * * * *